May 14, 1946. J. W. FITZ GERALD 2,400,110
COUPLING
Filed June 15, 1942
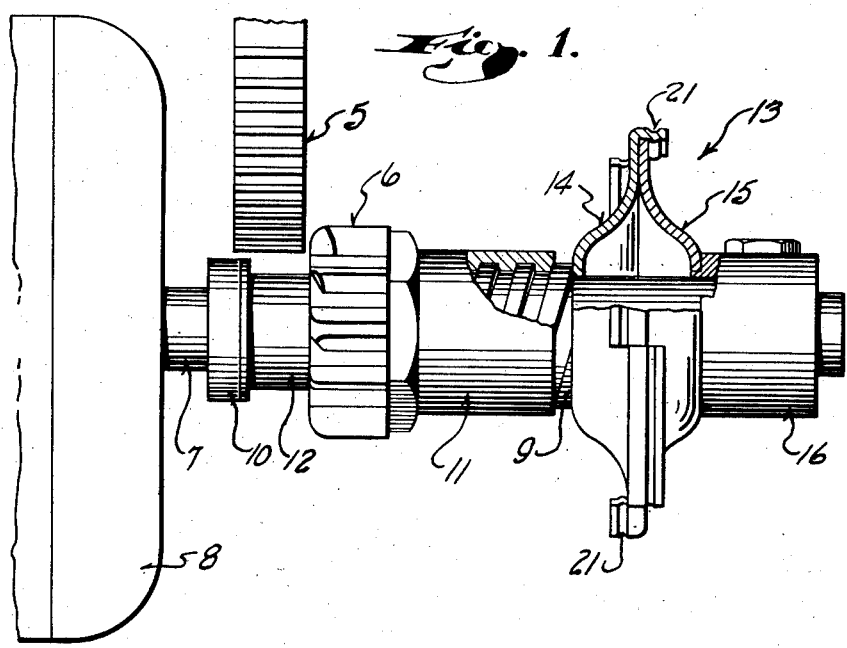
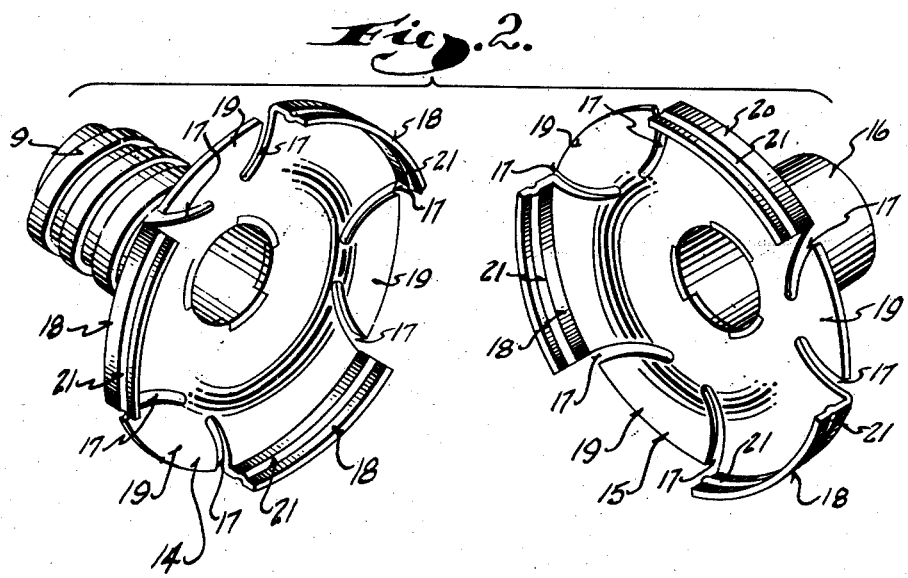
Inventor
John W. FitzGerald
By Ira Hutton Jones
Attorney Patented May 14, 1946

2,400,110

UNITED STATES PATENT OFFICE 2,400,110

COUPLING

John W. Fitz Gerald, Milwaukee, Wis., assignor to Briggs & Stratton Corporation, Milwaukee, Wis., a corporation of Delaware Application June 15, 1942, Serial No. 447,039

2 Claims. (Cl. 64—15)

This invention relates to engine starters and refers particularly to the so-called automatic starters wherein a pinion is propelled to and from an operative position meshing with the ring gear of an engine to be started, upon relative rotation between two threadedly connected parts.

As is well known to those skilled in the art, starters of this type must incorporate a yieldable driving connection through which the torque to the pinion is carried, and this invention has as its object to provide an improved, simplified, yieldable connection for this purpose.

Another object of this invention is to provide a driving connection which, although it carries the torque directly, does not yield torsionally, thus simplifying the construction of the connection.

Another object of this invention is to provide a yieldable driving connection for engine starters of the character described which is formed entirely of metal and which may be produced at very low cost.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a side view of an engine starter embodying this invention, parts thereof being broken away and in section; and Figure 2 is a perspective view of the two complementary elements which together comprise the yieldable driving connection.

Referring now particularly to the accompanying drawing, in which like numerals indicate like parts, the numeral 5 designates the ring gear of an engine to be started with which a pinion 6 is adapted to be meshed. The pinion 6 is part of the starter mechanism which is mounted on a power shaft 7 driven from an electric motor 8. Relative rotation between the pinion and a screw threaded actuator 9 propels the pinion longitudinally or axially to and from its operative meshing position defined by a pinion stop 10. An internally threaded sleeve 11 on the pinion provides the connection between the actuator and the pinion.

The actuator 9 is freely slidably and rotatably mounted on a hollow shaft or tube 12 between the pinion stop 10 which is secured to the tube and a yieldable driving connection, indicated generally by the numeral 13. The hollow shaft or tube 12 is fixed to the motor shaft; hence the yieldable driving connection serves to couple the actuator to the drive shaft.

This yieldable driving connection comprises two complementary resilient dish-shaped members 14 and 15, the former being rigidly secured to the screw threaded actuator 9 and the latter being secured to a collar 16 which is fixed to the tube 12 and the drive shaft 7. These dish-shaped complementary members face each other and have their peripheral edge portions interengaged to provide a torque transmitting connection therebetween.

To effect this interengagement between the peripheral portions of the coupling members and provide resiliency, each member has slits 17 dividing it into three radial wide arms 18 and three narrower arms 19. The peripheral portions of all of the arms are substantially flat so that the arms of one member engaged flatwise with the arms of the other.

Each wide arm 18 has a cylindrical flange 20 on its peripheral edge. The arcuate length of these flanges is substantially equal to the distance between them so that when the two members are interengaged the ends of the flanges abut to provide a direct torque transmitting connection between the two members.

Obviously, the narrower arms 19 on one member engage the wider arms 18 of the other member and to hold the members assembled beads 21 are formed in the flanges to engage over the edges of the arms 19.

In operation, upon initial rotation of the drive shaft, the screw threaded actuator 9 is positively driven and revolves within the internally threaded sleeve 11 to propel the pinion forwardly into mesh with the ring gear. In the event of accidental misalignment and abutting of the teeth the endwise resiliency of the driving connection 13 accommodates the interruption with forward propulsion of the pinion in the customary manner.

Upon complete meshing of the pinion with the ring gear the screw action of the threaded connection of the actuator 9 with the pinion sleeve 11 imparts a rearward thrust on the actuator against the resiliency of the connection 13. The connection 13, however, is stiff enough to carry this thrust developed by the screw and thus provides the necessary cushion for taking up the load of the engine. Obviously, as the rearward axial displacement of the actuator progresses the yielding resistance afforded by the connection 13 increases until the load on the starter is picked up.

From the foregoing description, taken in connection with the accompanying drawing, it will be readily apparent to those skilled in the art, that this invention provides an exceedingly simple and inexpensive yieldable driving connection for engine starters of the character described.

What I claim as my invention is:

1. A coupling for drivingly connecting two axially aligned rotatable members having limited relative axial movement, comprising: cooperating complementary driving and driven elements having a circumferentially interlocking connection with each other for positive non-yielding torque transmission, each connectable with one of said two members, at least one of said elements having inherent axial resiliency so that the coupling has axial but not torsional resiliency; and another connection between said members for holding the same against axial movement apart, said other connection being automatically established upon pressing of the members together to circumferentially interlock the same.

2. A coupling for drivingly connecting two axially aligned rotatable members having limited relative axial movement comprising: cooperating similar dish-shaped driving and driven elements each having a plurality of spaced spring arms, alternate spring arms having lateral flanges on the circumferential edges thereof, said flanged edge portions of the spring arms having substantially the same circumferential dimension as the arcuate distance therebetween; and said driving and driven elements having their inner surfaces facing each other and their flanged spring arms interlocking to form a positive non-yielding torque transmitting connection therebetween, and each of said elements being connectable with one of said rotatable members so that said interlocked elements form an endwise resilient but positive non-yielding torque transmitting driving connection between said members.

JOHN W. FITZ GERALD.